June 12, 1934.  O. U. ZERK  1,962,547
TRIPOD
Filed May 14, 1932  5 Sheets-Sheet 2
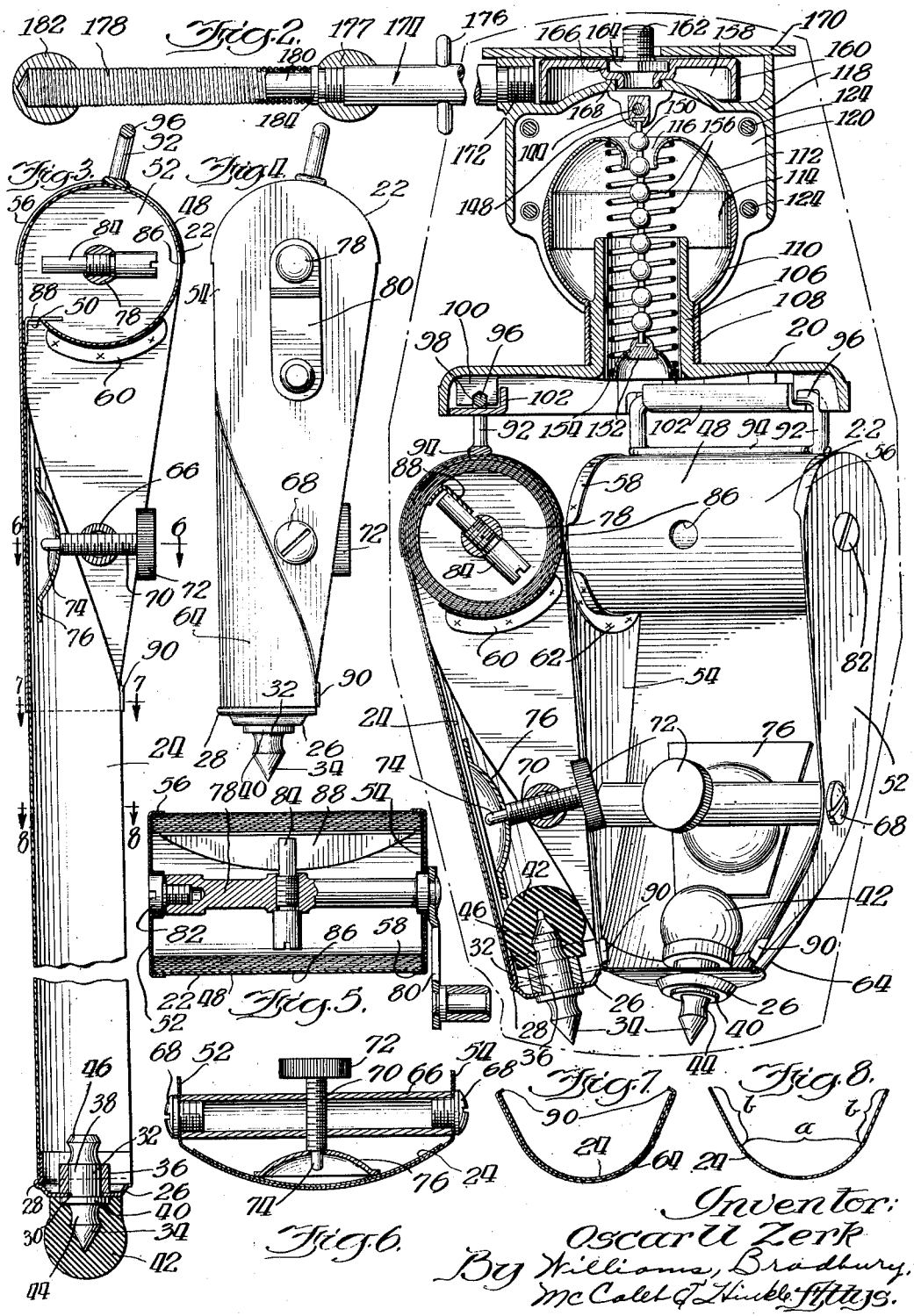
Inventor:
Oscar U Zerk
By Williams, Bradbury,
McCalet & Hinkle Attys.

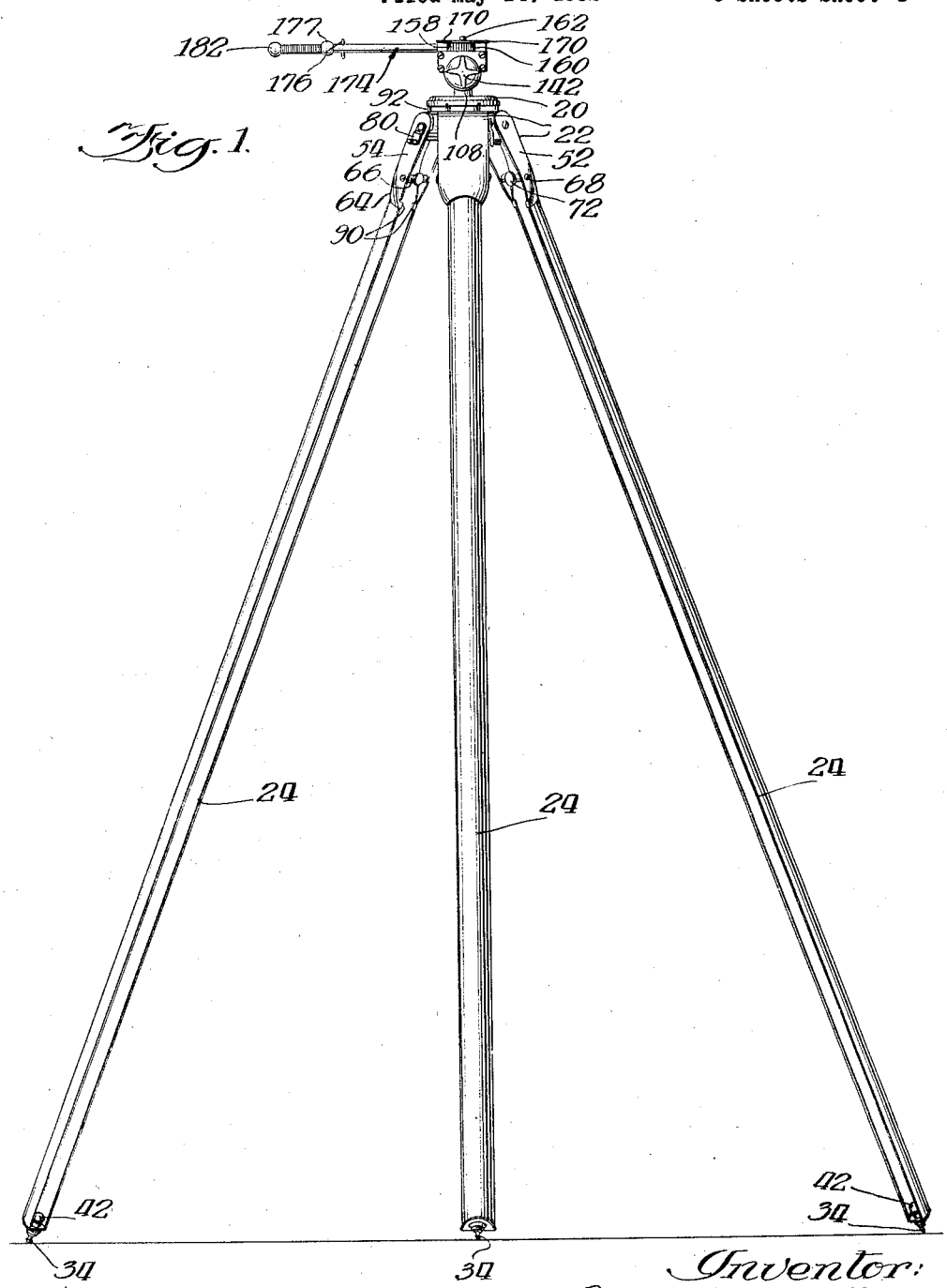

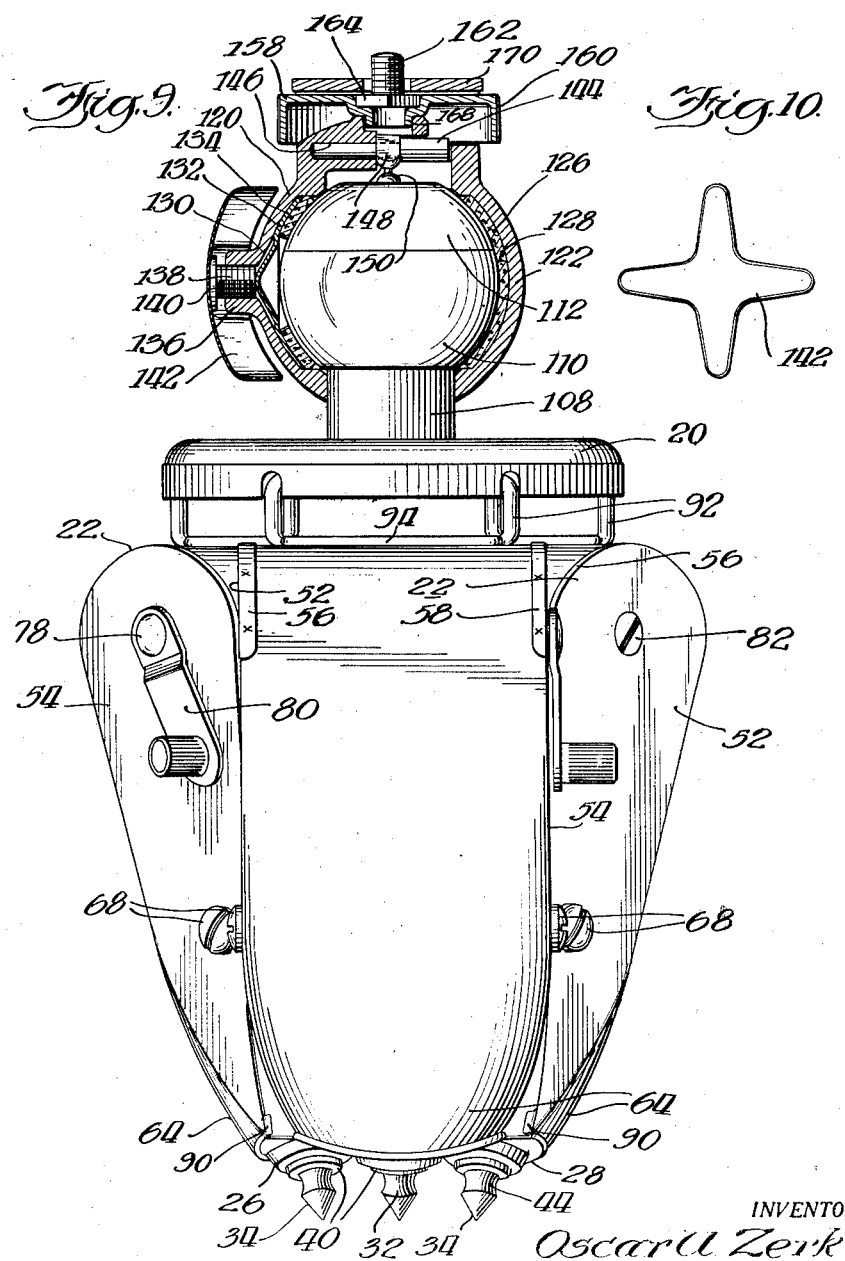

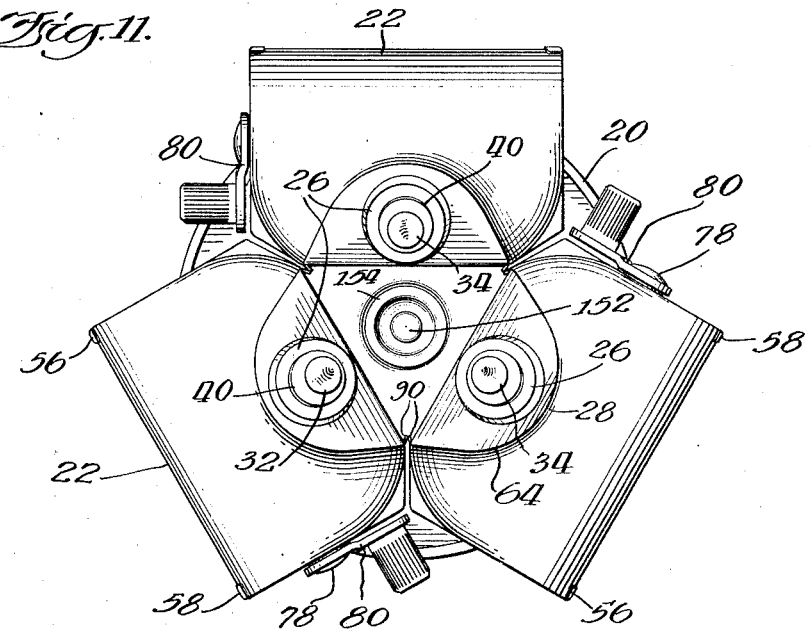
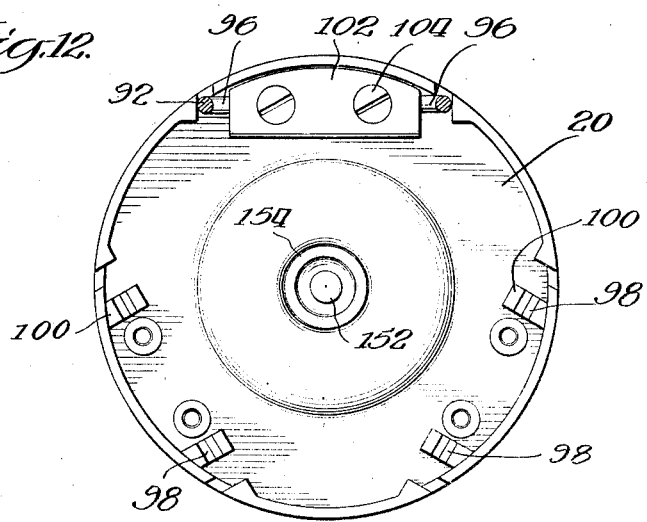

June 12, 1934.　　O. U. ZERK　　1,962,547
TRIPOD
Filed May 14, 1932　　5 Sheets-Sheet 5
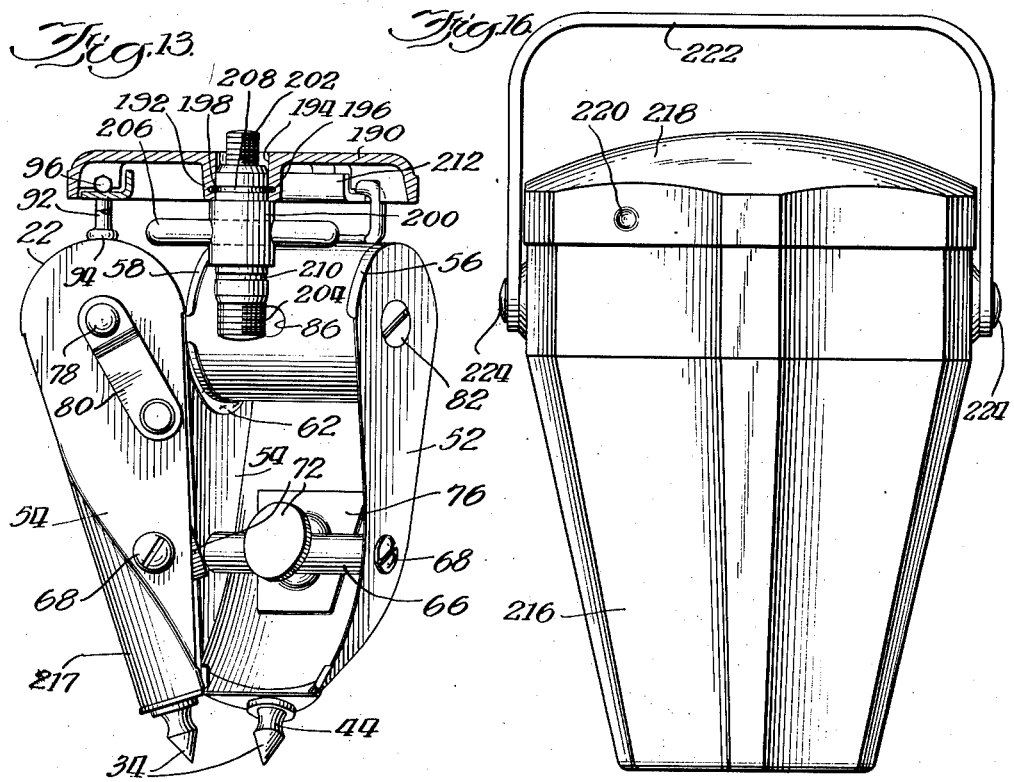
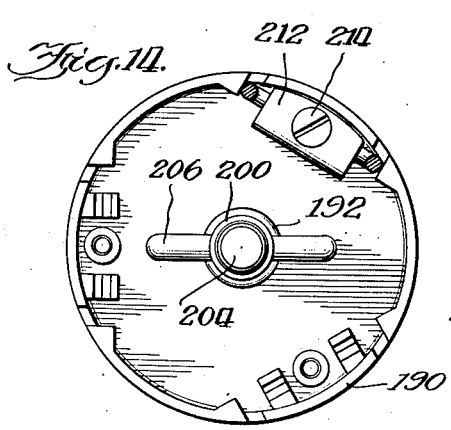
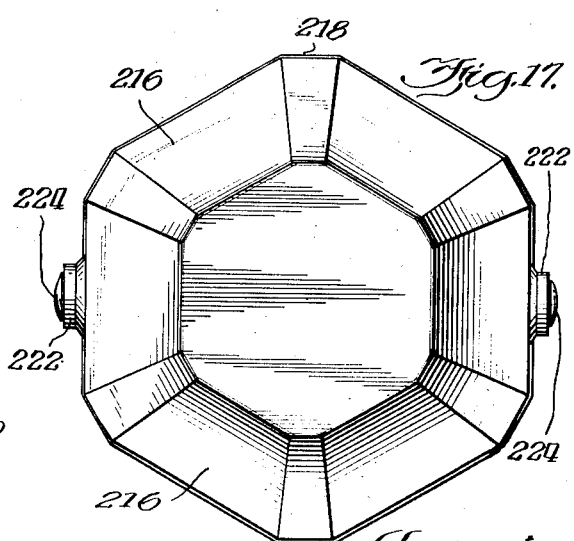
Inventor
Oscar U. Zerk
By Williams, Bradbury,
McCaleb & Hinkle Attys Patented June 12, 1934

1,962,547

UNITED STATES PATENT OFFICE 1,962,547

TRIPOD

Oscar U. Zerk, Chicago, Ill.

Application May 14, 1932, Serial No. 611,338

10 Claims. (Cl. 248—43)

My invention relates generally to tripods and more particularly to tripod legs, especially to a leg construction adapted for supporting the lighter types of still and motion picture cameras.

Tripods as at present used for still and motion picture cameras have two different general types of legs. One type is used to support the smaller type of motion picture camera, while another type is generally used for supporting still cameras. Tripods of the type generally used for motion picture cameras are usually about three feet long when collapsed, are large and cumbersome, are relatively heavy, and hence are not conveniently portable. The lighter type, as generally used for supporting still cameras, while more compact when collapsed, has the pronounced disadvantage that when the legs are extended the tripod lacks rigidity, due to the play in the joints between the various leg sections, and even when the tripod is composed of legs having from four to six sections and the joints between the sections designed to be quite rigid, so many clamping and unclamping operations are necessary, when setting up and taking down the tripod, that the advantage of the compactness of the tripod when collapsed is greatly negatived by the time and effort necessary to set up and take down the tripod.

Tripods are necessary for photography with the smaller types of motion picture cameras, especially for the spring motor driven 16-millimeter sub-standard film cameras in two cases:

(1) When taking panoramic views, where an extremely slow movement of the camera is necessary to assure that the projected picture will not be irritating to the eye.

(2) When taking telephoto pictures with the more powerful type of telephoto lenses, such as 4" or 6" lenses.

It will also be readily understood that a tripod will be absolutely necessary when taking long exposures through filters with still cameras. Recent developments in filters have shown that photographs showing contrasting clouds may be taken, or mist or haze can be penetrated, by the use of powerful dark yellow filters such as the Wratten K—2, K—3 and G filters, or by the use of a Wratten A filter, which is red. In view of the fact that the multiplying factor of the length of exposure (or size of aperture) for a highly sensitive orthochromatic film now sold on the market under the name of "Verichrome" is 8, when using a K—2 filter; 11 when using a K—3 filter; 16 when using a G filter, and considerably more than 16 when using an A filter,—the necessity of using a tripod for such long exposures will be readily appreciated.

It is the principal desideratum of my invention to produce a tripod in which each of the legs is made of a single piece, which can be collapsed to such small size that the collapsed tripod has an over-all length about one-fourth of that of the shortest collapsed tripod previously produced.

Another aim of my invention is to produce a relatively rigid tripod which is much lighter in weight than tripods of corresponding strength and rigidity previously produced; in fact, the tripod of my invention weighs only approximately one-half as much as the lightest tripod for corresponding use previously produced.

I accomplish the above mentioned results by making the tripod legs of thin, curved, resilient metal bands which may be rolled into a suitable magazine, in a manner similar to that employed to some extent in metal tape measures. The rigidity of metal tape measures is extremely small because of the relatively slight curvature of the tape which, however, makes the tape sufficiently rigid to support its own relatively light weight when it is fully extended, since a tape measure of this type is, of course, not intended to have external loads applied thereto. The sheet metal strip which I employ for a tripod leg in the tripod of my invention is given a considerably greater curvature, in order to increase its rigidity to such an extent that it will not only carry the weight of a camera weighing several pounds but, in addition, will be sufficiently rigid to withstand shocks incurred due to lack of careful handling of the tripod or camera when taking exposures, and will be sufficient to prevent movement when the camera and tripod are exposed to sudden gusts of wind.

I have found that a hardened and tempered steel strip, about .008" thick and 2⅜" wide when flat, and when curved having a width of 1 $\frac{1}{16}$" and a depth of $\frac{13}{16}$", will be sufficiently rigid to support the smaller motion picture cameras, while for the smaller type of still cameras a tripod leg comprising a hardened and tempered steel strip from .006" to .008" thick and about 1½" wide when flat, and when in curved position having a width of 1" and a depth of ½", will make the tripod sufficiently rigid.

The advantage of using a flexible and resilient metal strip for a tripod leg is, of course, dependent upon the fact that such a strip may be rolled into a suitable magazine, and to make it possible to roll the strip it is necessary that the curved strip be formed into a flat strip with relative ease. I have discovered that the strip may be readily flattened by making it of such cross section that the central portion only is curved and that the edge portions are substantially straight. A strip of this shape, having the plane edge portions can be flattened out much more readily than a strip which is semi-circular in cross section.

To utilize the curved resilient sheet metal strip as a tripod leg in a practical manner, I prefer to provide a magazine at the upper end of the leg and provide a foot at the lower end of the leg. While this is the most practical manner of using this tripod leg, it will be understood that the magazine may, if desired, be placed at the lower end of the leg, in which event the foot will be attached to or formed integrally with the magazine.

When using the magazine at the upper end of the tripod leg, it is important to have means to reinforce the strip throughout the length of that portion thereof which is flat or in only partially curved formation. I accomplish this by providing the magazine with a downward extension, in which the upper portion of the extension has a substantially flat bottom while the lower portion of the extension is conformed to the shape of the strip in its normally curved conformation. The magazine extension thus forms a rigid bridge between the magazine proper and the rigid portion of the strip. The magazine extension also serves as a means to guide the strip and to change its conformation from flat to curved, and vice versa, when withdrawing the strip from and returning it to the magazine.

The extension is preferably made channel-shaped so as to impart great rigidity thereto. The change of form of the tripod leg as it is moved through this magazine extension is gradual, from straight to curved or vice versa, and the shape will be such that the change of form of the metal strip forming the leg will be as rapid as possible without exceeding the elastic limit of the steel. In other words, it would be possible to form the magazine extension so that this change of form would take place very gradually, but in this case the magazine extension would have to be extremely long; and since it is one of the objects of my invention to make a tripod which can be collapsed to occupy a minimum amount of space, I make this extension as short as possible. It would be possible to make the extension considerably shorter than I propose to make it, by having the strip leave the extension before it is fully formed to its final shape, but since the leg would thereby be slightly wider at the point immediately adjacent the extension, I prefer to make the extension sufficiently long and of such shape that the strip of steel will assume its normal shape while it is still reinforced and supported by the extension.

The tripod leg is inserted into the magazine through a slot-shaped opening therein when the leg is in its flattened form. After a few turns have been forced into the magazine, the friction between the outer coil and the magazine becomes so great that it is impossible to force additional turns of the leg into the magazine by pushing the leg inwardly. This is due to the fact that the leg is very resilient, and the coiled-up portion within the magazine tends to expand and exert a considerable pressure upon the magazine walls. Various means may be employed to overcome this difficulty, such as a centrally located spiral clock spring or a torsion spring made of spring wire. I prefer, however, not to use a spring because of the added weight, the expense, and the liability of the spring to break or otherwise to get out of working order. Other means which might be provided to decrease the friction between the outer coil and the magazine are also cumbersome and not particularly suited to use in a small, compact, light-weight tripod. I therefore prefer to use a manually operated crank mechanism to pull the leg into the magazine. It is not necessary to use the crank for withdrawing the leg for during the latter operation it may be readily pulled out.

The crank mechanism which I prefer to use to pull the leg into the magzaine comprises a centrally located shaft and a crank exterior of the magazine rigidly connected to this shaft. This shaft assembly may be inserted through a central hole in the magazine and, after the shaft has been rotatably secured in the magazine, a stop member preferably in the form of a screw is inserted through a conveniently located hole in the casing and secured to the central shaft so as to form a radially projecting arm thereon, which will engage with a terminal lug secured to the end of the leg. This member or screw is so proportioned that it will not touch the innermost coil of the leg when the latter is completely pulled into the magazine. The terminal lug is preferably an L-shaped sheet metal stamping, which may be riveted or welded to the end of the leg. When the leg is wound up or partially wound up within the magazine, one portion of the terminal lug extends radially inwardly a short distance, sufficiently at all times to be engaged by the screw or similar member attached to the central shaft. Any other suitable means may be utilized for connecting the upper end of the leg to the central rotatable shaft. For example, the tripod leg may be joined to the shaft by means of a detachable hinge connection, or may be otherwise secured to the shaft.

To prevent the tripod leg from being pulled completely from the magazine, the longitudinal opening in the magazine is made narrower than the terminal lug on the tripod leg, and since the lug projects at substantially right angles to the leg, the lug forms a fixed stop to prevent complete withdrawal of the leg. The tripod leg may readily be inserted into or removed from the magazine, as will appear hereinafter. Thus, the leg may be removed for cleaning or replacement without any difficulty.

The magazine and its extension are preferably made of a single piece of sheet metal formed and welded together into a strong, rigid unit. The magazine extension is provided with means to hold the leg therein, such means being preferably in the form of inwardly bent lugs at the lower end of the extension. The extension being of channel form, it is preferable to provide means to prevent the sides from spreading, and for this purpose and to increase its rigidity and strength I provide a cross tube or strut which is rigidly secured to the side walls of the extension and at the same time forms a means to support a clamp by which the leg may be secured in any desired position. This clamp is preferably in the form of a flat member which may be used to press the leg against the extension, a suitable screw thread having a knurled head being employed to exert the necessary clamping pressure. By this means, the length of the leg may be easily adjusted to suit the surface upon which the tripod is to stand. The clamps also serve as a means to hold the upper portion of the leg and the magazine extension in intimate contact, so that the latter will form an effective reinforcement for the latter, eliminating possibility of relative motion between these parts, with the result that the rigidity of the tripod is grealy increased.

I preferably employ a novel form of hinge construction for connecting the tripod leg magazine to the tripod head plate. The hinge may be formed by a bent wire flattened and welded to the top or the sides of the magazine, and by pressing inwardly extending hinged portions of this wire against a tapered notched bearing surface by means of a pressure plate which is L-shaped in cross section.

The foot of the tripod leg is secured to the curved lower end thereof by means of a stamping which is preferably attached by welding. With this construction, I preferably use a hardened steel foot which is secured to the stamping by means of a ring pressed over an inwardly projecting portion of an extension of the foot. The latter serves as a means for holding a rubber shoe, which may be detachably secured to the foot proper whenever it is desired to use the tripod upon a smooth floor, where the regular pointed foot might damage the surface.

As will hereinafter appear, by reference to the accompanying drawings, an extended tripod for light motion picture cameras, which may be, for example, 70" in height, will be reduced to approximately one-seventh of this dimension (9½" long) in its collapsed state while the lighter weight tripod for use with small still cameras may be, for example, of such size that it is only 4¾" long when fully collapsed.

The tripod legs are preferably made of a heat treated rust-proof alloy steel having a high percentage of chromium and carbon, while the magazine and its extension are preferably made of a soft grade of rustless steel, about .010" thick, to which the hinge wires, which likewise are preferably made of rustless steel, may be electrically welded. It will be noted that I prefer to construct the tripod so that the hollow concave portions of the legs will face inwardly, toward the central axis of the tripod, and thereby have each leg in the position in which it will resist deformation to the greatest extent possible by the forces normally exerted upon it in use.

As is well known, a member of channel-shaped section has greater resistance to bending when the edges are subjected to tension than when the force is applied in such manner that the edges are under compression. When the edge portions of a channel-shaped strip, especially a flexible strip of the type which I utilize, are subjected to compression, they have a tendency to spread away from each other, thereby decreasing the section modulus about the transverse axis and consequently decreasing the strength of the strip against deformation by bending. When, however, the channel-shaped strip is positioned so that the edge portions thereof are subjected to tensile stress by the forces normally applied thereto, the strip will have greater resistance to bending because the forces applied will tend to maintain the strip in channel section, rather than tend to flatten the strip.

The above general description of my invention will, it is believed, make clear a number of the objects and advantages thereof, other objects appearing in the accompanying detailed description in which reference will be had to the accompanying drawings, wherein Figure 1 is an elevation of my improved tripod with the legs in extended position;

Figure 2 is a central vertical sectional view of the tripod showing the legs in collapsed position;

Figure 3 is a central vertical sectional view of a tripod leg and magazine, showing the leg in extended position;

Figure 4 is a side elevation of a tripod leg and magazine with the leg in collapsed position;

Figure 5 is a longitudinal cross-sectional view of a leg magazine;

Figure 6 is a transverse sectional view, taken on the line 6—6 of Figure 3;

Figure 7 is a transverse cross-sectional view, taken on the line 7—7 of Figure 3;

Figure 8 is a transverse sectional view, taken on the line 8—8 of Figure 3;

Figure 9 is a side elevation of the tripod with the legs in collapsed position, the tilt-table portion being shown in central cross-section, and the view taken at an angle of 90° relative to Figure 2;

Figure 10 is a side elevation of the wing handle of the clamping element;

Figure 11 is a bottom plan view of the tripod with the legs in collapsed position;

Figure 12 is a bottom plan view of the tripod head plate, showing one of the hinge wires in section, while the other two hinge bearings are shown with the hinges and hinge clamping plates removed;

Figure 13 is a side elevation of a tripod for use with still cameras, the head thereof being shown in central vertical section;

Figure 14 is a bottom plan view of the head plate of the tripod shown in Figure 13, one of the hinge wires being shown in section, and with the hinge plates of two of the bearings removed;

Figure 15 is a transverse sectional view of the tripod leg and magazine extension of the tripod shown in Figure 13;

Figure 16 is a side elevation of a hexagonal sheet metal carrying case for the tripod shown in Figure 13, and Figure 17 is a bottom plan view of the case shown in Figure 16.

As previously pointed out, the tripod comprises, generally, a head plate 20, to which three magazines 22 are hingedly joined, each magazine forming a housing for a resilient sheet metal strip 24 forming the tripod leg. As shown in Figs. 2 to 8, inclusive, the tripod legs normally assume a channel or trough shape, best illustrated in Figure 8. The central portion, bracketed and designated $a$ in Figure 8, is arcuate, while the edge portions, bracketed and designated $b$, are flat and form tangential continuations of the arcuately-shaped portion. To secure the necessary rigidity, it is desirable that the leg be formed with a relatively deep channel or trough. If it were endeavored to accomplish this by making the leg entirely arcuate in cross-section, the force necessary to overcome the resiliency of the leg when it is to be flattened for rolling it into the magazine would be very great and would thus materially increase the amount of power required for this operation. It will be understood that the power or force required to roll the leg into the magazine is necessary not only to overcome the resiliency of the strip, but also to overcome the friction of the strip against the walls of the magazine. If it required relatively great pressure to flatten the leg, the friction against the wall of the magazine would be correspondingly increased. Thus by making the edge portions of the leg flat, both the force necessary to overcome the resiliency and the force necessary to overcome the friction during the widening operation are decreased.

The lower end of the tripod leg is rigidly held in its normal shape by a pressed metal plate or cup 26, which is preferably welded to the extremity of the leg, the cup 26 being provided with a sidewardly projecting bead 28 to fix its position at the end of the leg. The cup has a central opening 30, through which a hardened steel pin 32, forming the tripod foot, projects. This pin is provided with a downwardly extending point 34, and is secured to the cup 26 by a collar 36, which is pressed over the cylindrical portion 38 of the pin, the portion of the cup 26 surrounding the aperture 30 being thus tightly clamped between the collar and a flange 40 formed on the pin. A relatively soft rubber shoe 42 is adapted to fit over the projecting end of the pin 32, being held thereon by reason of the fact that the rubber contacts about the portion 44 of reduced diameter directly above the point 34. The shoe 42 may be removed when the tripod is being used out of doors and attached to the upwardly projecting portion 46 of the pin 32, as shown in Figure 2. The rubber of which the shoe 42 is made is sufficiently soft and elastic that it will obtain a firm purchase upon a polished floor.

Each of the legs is carried by a magazine and magazine extension, which are preferably formed in the main of a single sheet metal stamping. The magazine proper comprises a substantially complete hollow cylinder 48 which, however, has a slot 50 left between the end of the sheet which forms the cylinder and the adjacent portion of the wall of the magazine extension. The end walls 52 and 54 of the magazine are formed from the same sheet from which the cylinder 48 is formed and are secured to the cylindrical portion of the sheet by semi-circular flanges 56 and 58, respectively, as well as by arcuate brackets 60 and 62, which are preferably spot welded to the end walls 52 and 54, respectively, and to the cylindrical wall 48. It will be understood that the flanges 56 and 58 are also preferably spot welded to the cylindrical portion 48 of the sheet, although they may be brazed, soldered, or otherwise secured thereto.

It will be noted, from Figures 3 and 4, that the magazine extension is formed in part by a continuation of the side walls 52, 54 of the magazine and in part by a warped surface portion 64. The portion 64 is of such shape that the tripod leg, as it is pulled outwardly from the extension, will gradually assume its normal conformation, as shown in Figure 8. The shape is such that the leg will at no place be subjected to forces which would stress the leg beyond its elastic limit. The side walls of the magazine extension are reinforced and held in position by a tubular cross piece 66 (Figure 3), which is threaded at its ends to receive screws 68, which pass through suitable openings in the side walls 52, 54, and tightly secure the walls to the cross piece. The cross piece is diametrically drilled and tapped at its center to receive a screw 70, having a knurled head 72. The end 74 of the screw 70 is cylindrical in shape and of reduced diameter and projects through a suitable hole formed in a presser plate 76. The presser plate 76 is quadrilateral-shaped and has a convex bulge formed at its center to strengthen it. The presser plate, due to the conformation of the adjacent portion of the leg 24, is adapted to contact with the latter at four spaced points and to clamp the latter against the adjacent portion of the magazine extension.

As best shown in Figure 5, a spindle or shaft 78 is mounted coaxially in the magazine cylinder 48 and has a crank handle 80 secured to one end thereof. The side walls 52, 54 of the magazine are flanged inwardly to form bearings for the shaft 78, and a shouldered cap screw 82 is screwed into the other end of the shaft 78 to form a bearing for said end of the shaft and to hold the shaft against axial movement.

It will be understood that the shaft 78 is inserted through the aperture formed in the side plate 54 and the cap screw 82 then screwed into place. Thereafter, a threaded pin 84 is inserted through an opening 86 (Figure 2) in the cylindrical portion 48 of the magazine and threaded into a suitable diametrical hole drilled and tapped through the central portion of the shaft 78. The pin 84 is adapted to engage a terminal angle bracket or lug 88, which is welded or otherwise tightly secured to the upper end of the leg 24. The projecting portion of the terminal lug 88 is sufficiently long to prevent complete withdrawal of the leg through the aperture 50 of the magazine and to permit engagement by the end of the cross pin 84. The terminal bracket also serves as a means to maintain the extremity of the leg 24 lineal in transverse cross-section. The lower end of the magazine extension is provided with a pair of inwardly extending lugs 90 which are adapted to be engaged by the edge of the leg 24 and to hold the latter within the extension.

Each of the magazines has a wire hinge member 92 rigidly secured to the cylinder portion 48 thereof, the portion 94 of the wire lying adjacent the cylinder 48 being preferably flattened so as to provide a binding surface of appreciable area for welding the hinge wire to the magazine cylinder. The wire hinge 92 has a pair of inwardly directed extensions 96 which are adapted to be received in notches 98 (Figures 2 and 12) formed in lugs 100 which project downwardly and are cast integrally with the head plate 20. The hinge extensions 96 are held in the notches or recesses 98 by an angle hinge plate 102 (Figure 12), which is secured to the head plate 20 by screws 104.

As shown in Figure 2, the hinge plate 102 is normally not drawn against the lower surface of the lugs 100, but sufficient play is allowed so that the plate may be drawn upwardly by means of the screws 104 a sufficient distance to take up play caused by wear. The hinge plate 102 forces the hinge extensions 96 sufficiently tightly in the notches 98 to cause sufficient friction at this hinged joint so that there will be no play at this point, and so that the magazines will be held against the action of gravity in any position in which they may be swung a short distance from the vertical axis.

The head plate 20 is preferably a light metal die casting and is provided with a central upwardly extending tubular projection 106, the lower portion of the projection 106 being threaded to receive the tubular neck 108, which is formed integrally with the lower ball half 110. The upper ball half 112 has a cylindrical portion 114 which fits snugly into a corresponding cylindrical opening in the upper end of the lower ball half 110. The upper ball half 112 has a central opening 116, preferably formed by a piercing operation, so that the adjacent portion of the ball forms a smoothly flaring bell mouth. Both the ball halves are preferably formed of sheet metal stampings, the neck 108 of the lower ball half 110 being thickened during the stamping operations sufficiently to make it possible to cut threads therein. After assembling the ball halves into a complete ball, they are preferably shaved to have an extremely smooth spherical external surface.

A tilt-table 118 is preferably a light metal die casting and has a socket half 120 cast integrally therewith. The other socket half 122 is likewise a casting and is clamped to the socket half 120 by a plurality of screws 124. The socket half 122 has a concave disc-shaped recess 126 formed therein to receive a packing 128, which may be made of cork, leather or other similar product or composition. The socket half 120 has a recess 130 formed therein, which contains a presser plate 132 and an annular concave packing 134 of material similar to that of which the packing 128 is made. The socket half 120 is provided with an outwardly extending boss 136, which is threaded to receive a screw 138 having a head 140. A handle 142 is spot welded to the head 140 of the screw 138. The handle 142 is preferably made of a sheet metal stamping, which is light in weight and may be economically produced. The end of the screw 138 is adapted to bear against the central portion of the presser plate 132 and serves as a means of causing the application of pressure between the packings and the ball.

A headed pin 144 is held in a drilled hole 146 formed in the tilt-table casting 118 of the socket half 122. The pin 144 forms a pivotal support for a block 148, forming the terminal of a linked ball chain 150. The lower end of the chain 150 is anchored in a terminal 152, which is held in a flanged pressed sheet metal stirrup 154. A compression coil spring 156 has its lower end seated upon the flange of the stirrup 154 and its upper end pressing against the upper ball half 112, being held in position relative thereto by the bell mouth 116 which it surrounds.

A wheel 158, having an externally striated downwardly projecting flange 160 forms a handle for rotating a camera attaching screw 162 which is non-rotatably secured to the wheel 160 by reason of the fact that its squared head 164 fits in a complementary recess 166 formed in the wheel 160. The wheel has a downwardly extending flange 168, which bears in a suitable aperture formed in the tilt-table casting 118. A camera supporting plate 170 is secured to the tilt-table casting 118 by means of suitable screws (not shown) threaded in the casting 118.

The tilt-table casting 118 is provided with a tapped hole 172 adapted to receive the threaded end of a handle 174, the latter being provided with a cross pin 176 for convenience in manually screwing the handle into the threaded socket and removing it therefrom. The handle 174 is provided with a knob 177 threaded thereto. A flexible handle 178, composed of a tightly wound coil spring, fits over a projection 180 formed at the end of the handle 174 and at its extremity carries a handle knob 182. A washer 184 is interposed between the spring handle 178 and the knob 177.

The tripod, when in collapsed position, may be inserted in a suitable casing, the outline of which is indicated by the dot and dash line of Figure 2. The handle 174 and associated parts is, of course, adapted to be unscrewed whenever the tripod is placed in the case.

In using the tripod, it is removed from the case, the handle 174 inserted and the legs extended by manually pulling on the feet thereof. Ordinarily, it will not have been necessary to have tightened the clamping screws 70, since the legs will be held in normal collapsed position by friction. When the legs have been extended to the desired length, the clamping screws 70 are tightened, thereby locking the legs against movement relative to the magazine extensions. The camera may then be attached by rotating the wheel 160, whereupon the screw 162 will be screwed into the threaded socket regularly provided in the casing of the camera. The handle 142 is then adjusted to exert the desired clamping pressure between the cork packings 128, 134, so that there will be an appreciable steady drag, which will be effective to cause every relative movement between the socket and ball to be steady and smooth.

In taking pan and tilt views, it is desirable to grasp the knob 182 at the extremity of the handle so that irregularities in the movement of the hand will not be directly transmitted to the camera, since the spring 178 will flex sufficiently to take up such irregularities. The friction of the packings 128, 134 on the ball will, ordinarily, be sufficient to maintain the tilt-table and camera in any position to which it may be moved, provided the camera is not tilted very far from the vertical.

When the camera is tilted from the vertical, its center of gravity no longer lies above the tripod head and the weight of the camera will tend to swing the head downwardly. This tendency is overcome in my present invention by means of the linked ball chain 150 and the compensating spring 156. It will be apparent that, as the tilt-table is tilted through an appreciable angle from its normal position, the linked ball chain will be pulled upwardly as it is pulled outwardly through the bell mouth 116 of the upper ball half 112. This upward pull on the chain is of course resisted by the spring 156, the resistance increasing with the degree of tilt. Since the torque due to the weight of the camera tending to tilt the tilt-table likewise increases as its angularity relative to the vertical axis increases, it will be apparent that the spring 156 will compensate for the torque due to the weight of the camera throughout substantially the range of positions to which the camera may be tilted. The tilting movement of the tilt-table is limited by engagement of the lower screws 124 with the neck 108 of the lower ball half.

As previously pointed out, the rubber shoes 42 may readily be clamped over the foot points 34 when the tripod is used indoors. Should it become necessary, for purposes of cleaning or other reasons, to remove the tripod leg, this may be accomplished readily by first removing the tubular cross piece 66. The leg 24 may then be pressed inwardly at its edges so that it may be swung upwardly past the lugs 90. Thereafter, it is swung to a substantially horizontal position (Figure 3), until the terminal lug 88 may be removed through the opening 50. After being cleaned, the leg may be reassembled in the magazine by the reverse procedure.

When it is desired to collapse the tripod, the clamping screws 70 are loosened and the crank handles 80 successively rotated to pull the legs into a coil within the magazine cylinder 48, as shown in Figure 2. Upon removal of the handle 174, the tripod may then be replaced in its case.

In Figures 13 to 15, inclusive, I have shown a modified form of a tripod suited particularly for use with the smaller type of still cameras. The tripod legs and hinges are constructed in substantially the same manner as those previously described, and a description thereof will therefore not be repeated. The head plate 190 is provided with an annular downwardly extending flange 192. The bore 194 within the flange 192 has an annular groove 196 formed therein to receive a wire resilient split ring 198. This ring serves as a means for holding a double camera attaching member 200, which has threaded ends 202, 204. These ends are of different diameter, to suit different cameras. A pin 206 passes diametrically through the central portion of the member 200 and serves as a handle by means of which the latter may be rotated. The member 200 is provided with a pair of annular grooves 208, 210, which are adapted to cooperate with the resilient split ring 198 and thereby be held in position. The ring is sufficiently stiff that the member may be rotated and the camera firmly clamped against the head plate 190. It is, however, yieldable sufficiently so that, by exerting a sudden force, the member 200 may be withdrawn and inverted and replaced when it is desired to use the tripod with a camera having a different sized socket. Since the owner of the tripod will ordinarily use it with but one camera, it will be necessary to reverse the member 200 only on infrequent occasions. It will be noted, from Figure 14, that the hinge plate 212 used with the smaller tripod may be secured in place by a single screw 214.

Figure 15 is a full sized transverse cross-sectional view of the leg 215 and magazine extension 217 forming part of the tripod shown in Figure 13. Figures 13, 14 and 15 have been shown in full size to illustrate the fact that the tripod of my invention may be made very small and compact.

The tripod head disclosed herein is disclosed and claimed in my copending application, Serial No. 611,339, filed May 14, 1932.

The case illustrated in Figures 16 and 17 is preferably drawn of sheet metal and comprises a body 216 and a cover 218. The cover and body are preferably provided with cooperating projection and notch means, as indicated at 220, by means of which the cover will be resiliently held upon the body of the case. A carrying handle 222, made of leather or other suitable material, is secured to the body 216 by a pair of headed lugs 224 which may be riveted, brazed, welded or soldered to the case body 216.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In a tripod, a tripod leg consisting solely of a channel-shaped resilient sheet metal strip, a foot secured to one end of said strip, a magazine connected to the other end, and reel means associated with said magazine for receiving said strip.

2. In combination, a thin normally channel-shaped resilient tripod leg, a magazine for said leg, means within said magazine for drawing said leg thereinto, and means secured to said magazine for guiding said leg thereinto and progressively conforming the strip substantially to transverse rectilinearity as the leg is moved into the magazine.

3. In combination, a thin resilient sheet metal strip normally channel-shaped, a magazine into which said strip may be coiled, a manually rotatable shaft in said magazine having means to engage the end of said strip to reel said strip into the magazine, and an extension secured to said magazine for guiding said strip thereinto, said extension having a substantially plane surface at the end adjacent said magazine and having its other end curved to conform to the normal channel shape of said strip.

4. In combination with a tripod head, a magazine hinged to said head, said magazine having an extension connected thereto, a resilient thin sheet metal leg substantially U-shaped in cross-section associated with said magazine, means associated with said magazine for holding one end of said leg flat, a magazine extension covering a portion of said leg and comprising means for deforming said leg from the normal U-shaped cross-section to a shape substantially rectilinear in cross-section, and means for pulling said leg past said extension into said magazine.

5. A tripod leg comprising a thin unitary channel-shaped resilient sheet metal strip, a foot connected to one end thereof, a magazine connected to the other end thereof, said magazine having means for receiving said strip in spirally coiled condition, a shaft rotatably mounted within said magazine, a manually engageable handle operably connected to said shaft, and inter-engageable detachable means for operably connecting said shaft and the end of said strip whereby rotation of said shaft will pull said strip into said magazine and spirally coil it about said shaft.

6. A tripod leg comprising a thin unitary channel-shaped resilient sheet metal strip, a foot connected to one end thereof, a magazine connected to the other end thereof, said magazine having a sheet metal extension, said magazine having means for receiving said strip in spirally coiled condition, a transverse brace across said extension to hold the latter against deformation, and means for pulling the strip through said extension into the magazine.

7. A tripod leg comprising a thin unitary channel-shaped resilient sheet metal strip, a foot connected to one end thereof, a magazine connected to the other end thereof, said magazine having means for receiving said strip in spirally coiled condition, an extension on said magazine, a transverse brace across said extension to hold the latter against deformation, and a clamp supported by said brace and arranged to press said strip against said extension thereby tightly to clamp said strip to said extension.

8. A tripod leg comprising a thin unitary channel-shaped resilient sheet metal strip, a foot connected to one end thereof, a magazine connected to the other end thereof, an extension rigid with said magazine, means associated with said magazine for pulling said strip thereinto in spirally coiled condition, and means associated with said extension to clamp said strip to said extension.

9. In a tripod, the combination of a tripod head, a plurality of magazines hinged to said head, each of said magazines containing a thin resilient sheet metal tripod leg spirally coiled therein in substantially flat condition, and means rigidly to clamp said leg to said magazine.

10. In a tripod, the combination of a head, a plurality of magazines hinged to said head, said magazines having extensions channel-shaped in cross-section and having the concave sides thereof facing the axis of the tripod, and a thin resilient sheet metal strip normally trough-shaped mounted within each of said magazines in rolled-up flattened condition with its adjacent turns in contact with one another, said strip being withdrawable from said magazine with its concave side thereof likewise directed toward the axis of said head.

OSCAR U. ZERK.